F. LOEDIGE.
JOURNAL LUBRICATOR.
APPLICATION FILED JUNE 19, 1913.
1,145,028.
Patented July 6, 1915.
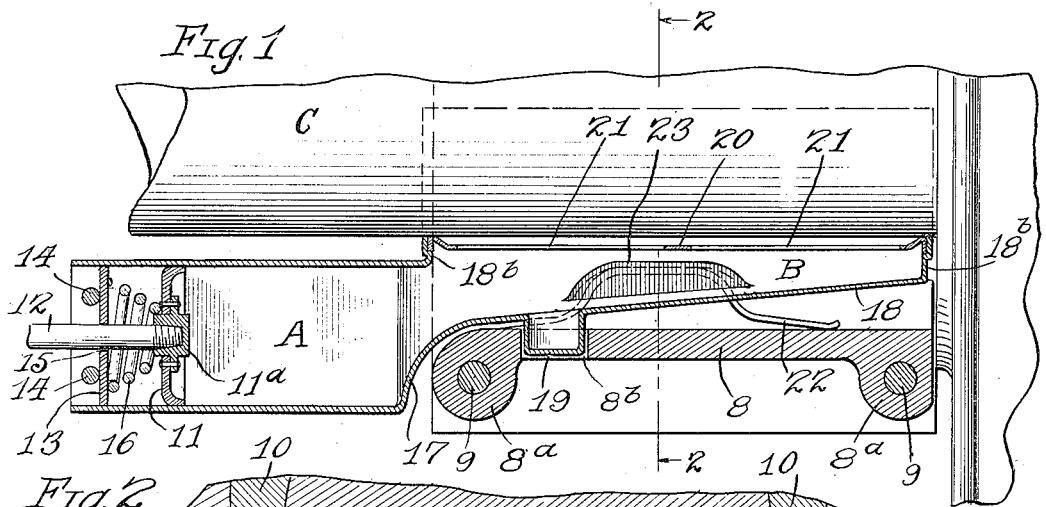
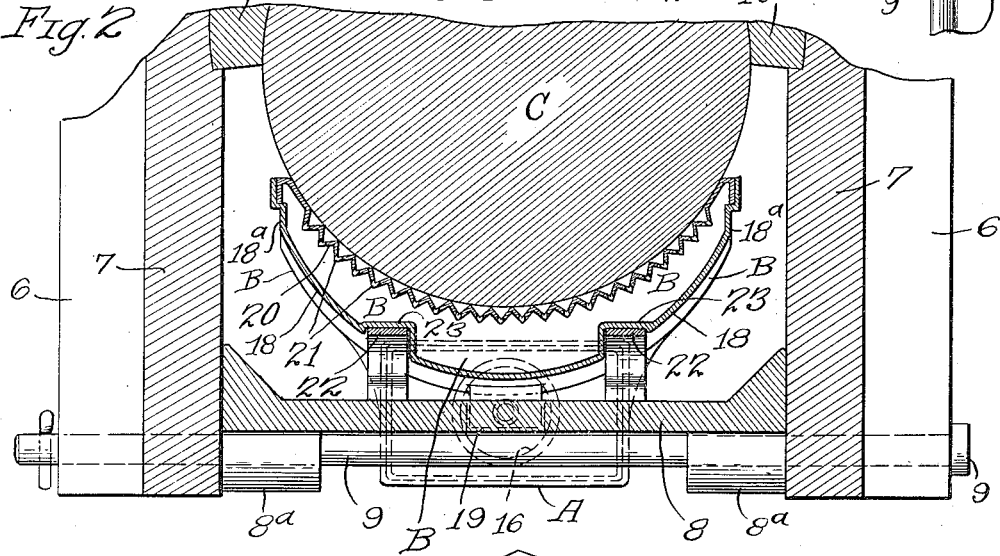
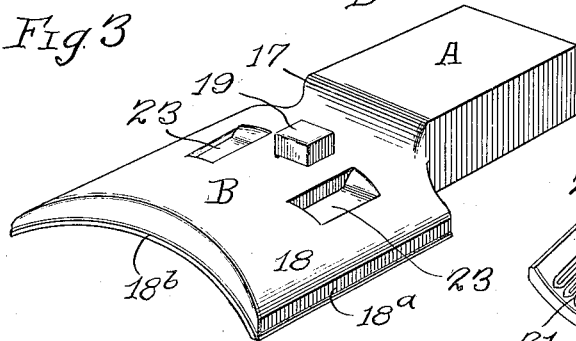
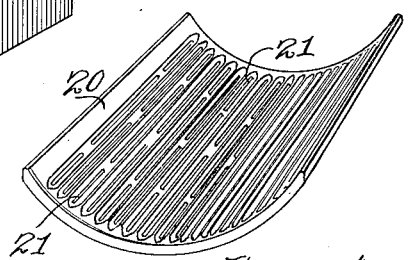
Witnesses:
L. B. Graham
R. E. Wighton.
Inventor
Frederick Loedige
By Heidman Street
Att'ys.

UNITED STATES PATENT OFFICE.

FREDERICK LOEDIGE, OF CHICAGO, ILLINOIS, ASSIGNOR TO JOURNAL LUBRICATOR COMPANY, OF CHICAGO, ILLINOIS, A CORPORATION OF ILLINOIS.

JOURNAL-LUBRICATOR.

1,145,028.   Specification of Letters Patent.   Patented July 6, 1915.

Application filed June 19, 1913. Serial No. 774,500.

*To all whom it may concern:*

Be it known that I, FREDERICK LOEDIGE, a citizen of the United States, and a resident of Chicago, in the county of Cook and State of Illinois, have invented certain new and useful Improvements in Journal-Lubricators, of which the following is a description, reference being had to the accompanying drawing, which forms a part of my specification.

My invention relates to lubricators more especially adapted for use in connection with journals or axles; the device being intended to be located in the journal bearings of locomotives and railway cars, whereby a constant lubrication of the car axles or journals and the axles of locomotives may be obtained.

The object of the invention is to provide means in which a lubricant of more or less solid consistency is especially intended to be employed instead of oil waste and the like; and also the use of a liquid lubricant is elminated, as both latter mentioned methods are more or less objectionable in railway practice.

Another object of my invention is the provision of a construction, the operation whereof will be automatic and result in a constant feeding of the lubricant to the journal or axle in a uniform manner.

A further object of my invention is to provide a device of as simple a construction as possible, adapted to be secured between the lower sides or ends of the pedestals of a journal bearing; and wherein the lubricant applying means is yieldingly maintained in close relation with the axle or journal to be lubricated; and again, wherein ready access may be had to the lubricant-containing chamber or holder without the necessity of employing special appliances or tools for the removal of parts; the construction being such that the holder may be re-charged with lubricant from time to time without the necessity of removing the entire device from its normal or operative position beneath the journal or axle and within the journal bearing.

A further object of my invention is the provision of a device wherein the lubricant will be maintained under constant pressure, without the necessity, however, of subjecting the pressure applying mechanism, whereby the lubricant is fed or applied to the axle or journal, to any undue strains or weight, as the pressure applying mechanism in my improved construction is not subjected to the weight of the mass of lubricant and the weight of the applying plate or means, as in constructions heretofore employed.

A still further object of my invention is to provide a device of such construction that the cost of manufacture and maintenance will be materially reduced over that of constructions as heretofore employed, and whereby the extent or amount of the supply of lubricant within the holder or device will be readily indicated; and, furthermore, wherein the possibility for leakage of the lubricant is substantially entirely eliminated; the construction possessing other advantages which will be apparent from the following detailed description.

In the drawing:—Figure 1 is a longitudinal sectional view of my improved device shown applied to a journal. Fig. 2 is a vertical sectional view taken on the line 2—2 of Fig. 1 and looking in the direction of the arrows. Fig. 3 is an inverted perspective view of my improved holder. Fig. 4 is a perspective detail view of the cover plate or member.

In the particular adaptation of my invention, I illustrate the same in connection with the journal box of a locomotive, it being understood, however, that the invention can be adapted to any journal bearing, whether applied to the driver of a locomotive, the axle or journal of a railway car, or other journals or axles, as the invention permits of its use in connection with any form of journal box or bearing.

In the exemplification, my invention is shown applied to a locomotive frame provided with the usual pedestal columns 6, 6, which are located inside of the driver; the journal box or bearing 7 being mounted between the pedestals 6, 6. Mounted between the journal box or bearing 7 is a platform or bottom plate 8, the sides whereof are preferably provided with the perforated lugs or enlargements 8ª, 8ª, which are adapted to receive sustaining bolts 9 whereby the platform is maintained in place within the journal box between the lower ends of the pedestals; the platform or bottom plate 8 providing means for supporting my improved lubricating device. The platform 8 is also preferably provided at a suitable point with an opening as indicated at 8<sup>b</sup>, see Fig. 1, for the purpose hereinafter to be described.

The lubricating device comprises a lubricant holder or chamber A and a trough portion B in communication with each other; the holder portion A being of any suitable formation, preferably rectangular as shown in Figs. 1 and 3, with the one end thereof terminating in the trough portion B, which is preferably made substantially semi-cylindrical as shown in Fig. 3, so as to adapt it to the lower side of the axle or journal C.

As clearly shown in Fig. 1, the holder portion A of the device is intended to extend to the side of the journal bearing, while the trough portion B extends within the journal bearing and normally into close relation with the lower side of the journal or axle to be lubricated; the device in the construction shown in the drawing being located on the hub side of the wheel.

The journal box or bearing 7 is provided with the usual journal brass or bearing 10, which is maintained in proper position in the usual manner by inwardly presented shoulders or lugs on the journal box; the latter being so constructed, however, as not to come into contact with the journal or axle C.

The holder portion A of the lubricating device is provided with a suitable piston or plunger 11, preferably cup-shape with the edges presented inwardly as clearly shown in Fig. 1; the central portion of the plunger being provided with a threaded opening to receive the threaded end of a rod or pipe 12. In order that the plunger proper may be made of thin sheet metal of sufficient strength to perform the function necessary, I prefer to provide the plunger with a boss or hub portion 11<sup>a</sup> having a threaded opening part-way therethrough to receive the end of the rod or pipe 12; the boss or hub portion 11<sup>a</sup> being secured to the plunger proper in any suitable manner.

The outer end of the holder portion A is provided with a suitable cap or covering plate 13 held in place in any suitable manner, as for example by the pins 14 extending through perforations in opposite sides of the holder portion, as clearly shown in Fig. 1, whereby outward movement of the cover or cap 13 is prevented. The cover or cap 13 is provided with a central opening as shown at 15 of a size sufficient to permit rod or pipe 12 to extend therethrough; and the rod or pipe 12 is preferably made of a length slightly greater than the length of the chamber or holder A, so that when the plunger or piston 11 is at the innermost point of its travel within the holder or chamber A, a sufficient portion of rod or pipe 12 will still extend through the cover or cap 13.

Intermediate of the plunger or piston 11 and cover or cap 13, I provide a spring 16, preferably in the nature of a helical spring as illustrated, which will permit the plunger to be drawn out to a point in close proximity to cover or cap 13 when the chamber or holder A is filled with the lubricant mass. The spring 16 is of such construction that it will force the plunger or piston 11 to the innermost end of chamber or holder A; the spring resting against and preferably secured to the cover or cap 13, with the inner or reduced end thereof encircling the hub portion 11<sup>a</sup> of the plunger 11. The plunger 11 will be maintained against wedging or sidewise movement, through the action of the spring, by the rod or pipe 12, as the latter extends through an opening in the cap or cover of a size just sufficient to permit of the free movement of the rod.

At the inner end of the holder A, the lower wall preferably curves upward as clearly shown at 17, see Figs. 1 and 3, and then extends or flares sidewise into the shallow pan or trough portion B in the manner clearly shown in Fig. 3 wherein the holder is shown in perspective in an inverted position. The trough portion B preferably becomes shallower toward the innermost end thereof or rather toward the opposite side of the bearing as very clearly shown in Fig. 1; the decreasing vertical dimension of the trough portion being preferably induced by the upwardly sloping bottom 18, so that the shallowest part of the trough is at the point farthest removed from the plunger.

The bottom 18 of the trough portion B, is preferably provided with a boss or lug 19 at a point adapted to register with the opening 8<sup>b</sup> in the platform or plate 8 of the bearing. The boss or lug 19 is preferably made of a cross section similar to the cross section of the opening 8<sup>b</sup> in the plate 8, so that when the lug or boss 19 is seated in the opening 8<sup>b</sup>, it will not only prevent the lubricating device moving or sliding out of the journal box, or bearing, but will also prevent more or less lateral movement of the lubricating device. The sides and ends of the trough portion B are presented upwardly as clearly shown at 18<sup>a</sup> and 18<sup>b</sup> respectively, see Figs. 1 and 3, so as to prevent the leakage of lubricant and also to receive the downwardly bent edges of the concavo-convex cover plate 20, which latter is adapted to fit over the trough portion B as clearly shown in Figs. 1 and 2 with its downwardly bent edges telescoping or preferably on the inside of the upturned edges 18<sup>a</sup> and 18<sup>b</sup> of trough portion B.

The plate 20 is intended to engage with the under surface of the journal or axle; and in its preferred form is corrugated longitudinally as clearly shown in Fig. 4, so as to provide longitudinally extending valleys and ridges; the ridges being in constant engagement with the under side of the journal C as clearly shown in Fig. 2 when the lubricant device is in normal or operative position; while the V-shape chambers or valleys intermediate of the ridges of the plate are preferably provided with a series of slots as clearly indicated at 21, to afford communication with the interior of the trough portion B. These slots 21 allow the lubricant in the trough or pan portion B to be forced upward into the valleys or V-shape chambers of the plate 20 where it will contact with the journal. The plate 20 is preferably loosely seated on the trough portion B, by means of its downwardly bent edges telescoping the upwardly presented edges and sides of the trough B, so that ready access may be had to the interior of the trough portion and thereby facilitate the cleaning thereof as well as the replacing of any worn or broken parts, without the necessity of replacing the entire device. It would be understood, of course, that the ends 18$^b$ of the trough portion B, like the concavo-convex cover plate, are dished or concaved so as to permit the trough portion to be brought into juxtaposition with the journal or axle C.

In order to maintain the trough B in proper relation with the journal and also prevent a longitudinal teetering movement of the device, and at the same time provide a yielding relation between the trough portion and the journal, I provide the springs 22, 22, which are preferably shown in the nature of bow springs, the ends whereof rest upon the platform 8, while their intermediate or bowed portions are seated in depressions or pockets 23 formed in the bottom 18 of the trough portion B; the location and construction of the pockets 23, 23, being more clearly shown in Figs. 2 and 3. In addition to the function of maintaining the trough portion B in proper yielding relation with the journal or axle, these springs also assist in preventing possible lateral movement, in the direction of rotation of the journal, on the part of the trough or pan portion B.

The improved lubricant device herein shown and described permits of the device being made of sheet metal stamped into form, so that the cost of manufacture will not only be materially lessened, but the weight of the construction will also be considerably reduced, and at the same time a construction will be produced which is less likely to become broken.

In the employment of my invention, the device is inserted between the depending ends of the bearing after the platform or bottom plate 8 has been secured in place by means of suitable bolts as indicated at 9 and the springs 22 have been put into position. After securing the platform 8 in place, the opening 8$^b$ will receive the boss or lug 19, and thus prevent the device falling out of the journal bearing. Before the device, however, has been put into place as described, it is understood, of course, that cover plate 20 has also been put into place on the trough portion B.

With the device in place, the cover or cap 13, together with plunger 11, and the intermediate spring 16, are withdrawn from the chamber or holder A so as to permit a properly formed cake or mass of solid lubricant, preferably of a quantity sufficient to substantially fill holder or chamber A, to be inserted into chamber or holder A, after which the plunger 11, together with spring 16 and cap 13 are replaced in the end of the holder, whereby the mass of lubricant within the holder will be put under pressure through the action of contracted spring 16 and plunger 11 and be forced into the trough portion B. The plunger 11 is adapted to fit securely within holder or chamber A so that the lubricant cannot escape to the rear side thereof, with the result that the constant pressure exerted on the mass of lubricant will not only force the lubricant throughout the shallow trough B but also induce the lubricant to pass through the perforations or slots 21 in the plate 20 and enter the longitudinally extending valleys in the upper surface of the plate. It is evident that as the valleys become filled, the lubricant will be brought into contact with the revolving journal or axle; and the slight heating of the plate 20, due to its frictional engagement with the journal, will result in a more or less softening of the lubricant and therefore induce a freer flow thereof.

It is evident from the construction shown and described, that springs 22 will not only compensate for the constant vibration to which the journal is subjected, but these springs will hold the trough portion and cover plate in constant contact with the under surface of the revolving journal or axle, the springs in performing this function being assisted by the construction of the device and method of mounting the same. It is also evident from the construction described that the lubricant feed spring 16 is not compelled to carry any weight as in constructions heretofore employed, so that the spring may exert its entire force in performing the function for which it is designed; and instead of employing but one lubricant feed spring, several may be employed as is readily apparent from the construction shown.

It is evident from the construction that the lubricant will be constantly protected so that it will be practically impossible for any dust or dirt to come into contact with the lubricant and the bearing surface of the journal.

I have shown and described what I believe to be the simplest and best form of my invention, but the same may be modified in certain respects without, however, departing from the spirit of my invention, and I do not wish to be understood, therefore, as limiting myself to the exact construction shown and described.

What I claim is:—

1. A journal lubricator, comprising a lubricant-receiving trough of increasing shallowness toward one end thereof and adapted to be secured between the lower ends of the journal box, an open-ended lubricant-holding portion adapted to be located outside of the journal bearing and having one end communicating with the deepest end of said trough, while the other end of said holder is provided with means adapted to move lengthwise of the holding-portion whereby the lubricant is under a constant pressure and forced in a direct line into said trough, and means intermediate of the trough and the bottom of the journal box whereby the trough is yieldingly maintained in close relation with the journal.

2. A journal lubricator, comprising an open-ended lubricant-holding portion, a concavo-convex trough of increasing shallowness toward one end thereof, the trough being adapted to be secured between the lower ends of the journal box while the holding-portion is adapted to extend outside of the journal box, said holding-portion having its one end communicating with one end of said trough, means mounted in the free end of said holding-portion whereby the lubricant is forced in a direct line into said trough, means whereby movement of the trough longitudinally of the journal is prevented, and means whereby the trough is yieldingly maintained in close relation with the journal.

3. A journal lubricator, comprising a lubricant-holding portion adapted to be located outside of the journal bearing and to receive lubricant through one end thereof, pressure applying mechanism mounted in one end of said lubricant-holding portion, a trough portion integral and in line with the opposite end of said lubricant-holding portion, the interior of the trough portion diminishing in depth toward the end farthest removed from the pressure applying mechanism and adapted to be located within the journal bearing, and a foraminated cover for said trough portion.

4. A journal lubricator, comprising an open-ended lubricant-holding portion, a lubricant-receiving trough of increasing shallowness toward one end thereof while the other end is in communication with said lubricant-holding portion, the bottom of said trough-portion being arranged to extend at an angle to the longitudinal axis of said holding-portion, means whereby the trough-portion is yieldingly maintained in close relation with the journal and movement thereof lengthwise of the journal prevented, and means whereby the lubricant is forced lengthwise of the holding-portion into said trough.

5. In combination with a journal bearing provided with a platform removably secured therein and having a socket, of a lubricator comprising a holder portion provided with pressure applying mechanism at one end thereof whereby the mass of lubricant within the holder will be maintained under constant pressure in a lengthwise direction, a trough portion integral with the opposite end of said holder portion and in communication therewith, said trough portion decreasing in depth toward the opposite or free end thereof and being provided with spring receiving sockets in the bottom thereof and a depending portion adapted to engage with the socket in said platform whereby the lubricator is maintained in place, and a foraminated cover for said trough portion.

FREDERICK LOEDIGE.

Witnesses:
GEORGE HEIDMAN,
R. E. WIGHTON.